Aug. 26, 1941.     H. E. DOW     2,253,612
PULLEY
Filed Jan. 31, 1940
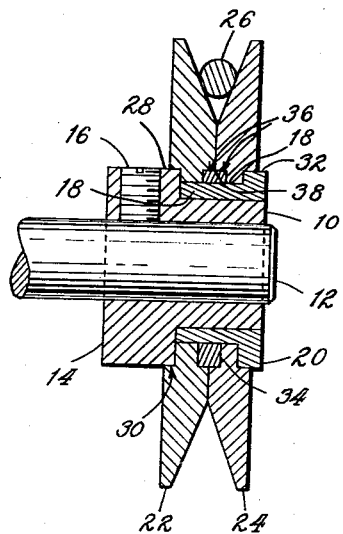
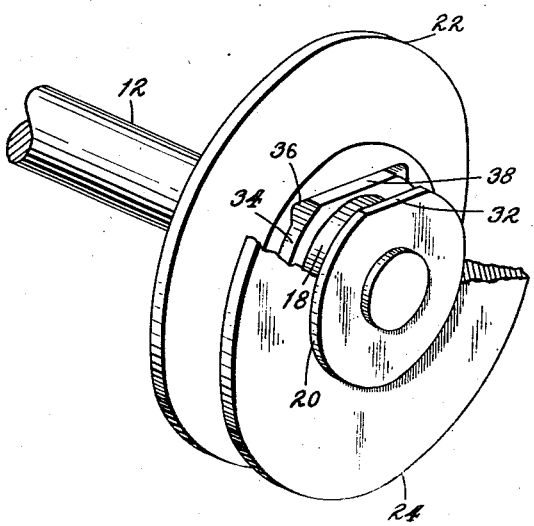
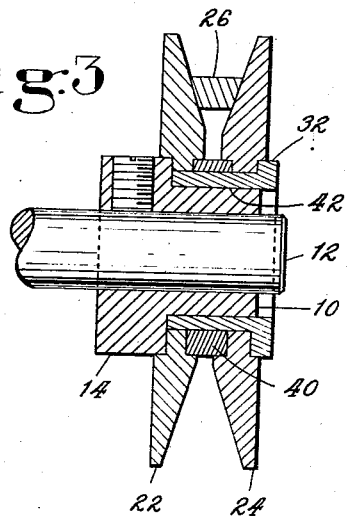
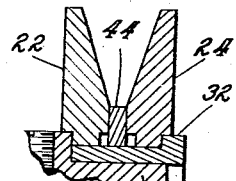
INVENTOR
Harry E. Dow
By his attorney
Victor Cobb Patented Aug. 26, 1941

2,253,612

UNITED STATES PATENT OFFICE 2,253,612

PULLEY

Harry E. Dow, Beverly, Mass., assignor to United Shoe Machinery Corporation, Borough of Flemington, N. J., a corporation of New Jersey Application January 31, 1940, Serial No. 316,460

2 Claims. (Cl. 74—230.3)

This invention relates to pulleys and is herein illustrated and described as embodied in a grooved pulley adapted for use with either a round or a V-belt.

In many machines employing a belt drive, it is desirable to be able to change the speed of the machine from time to time. This may advantageously be accomplished by employing a pulley of a different diameter, but to solve the problem in this manner requires that a large number of pulleys be kept on hand, thus tying up an unnecessarily large amount of money in pulleys. Accordingly, it is an object of the present invention to provide a pulley structure which can be readily assembled or disassembled and in which the changing of a few small parts will result in altering the effective diameter of the pulley.

With this object in view, the invention provides a pulley structure comprising a hub having an integral flange, a collar having a flange and fitting over the hub in frictional driving engagement therewith, and a pair of sheave sections clamped between the flanges. The driving connection between the hub flange and the adjacent sheave section is effected by shaping the flange to fit into a corresponding recess in the sheave section so as to prevent relative rotation between these two parts. The invention further contemplates similar interlocking between the flange of the collar and the sheave section adjacent thereto and also between the two sheave sections and a driving ring fitted over the collar between them. Alternatively, such a ring may be used merely as a spacing washer to separate the flanges and thus shift radially the points on the sheave sections at which the belt engages the pulley.

The invention will be better understood when considered with relation to the accompanying drawing, in which Fig. 1 illustrates a vertical cross section of the pulley;

Fig. 2 is a perspective view of the end of the pulley, a portion of one of the sheave sections being broken away;

Fig. 3 is a view similar to Fig. 1 but showing a thick driving ring between the sheave sections; and Fig. 4 shows a section of the pulley assembled with a spacing washer.

Referring now to Fig. 1, a hub 10 bored to fit over the end of a shaft 12 has formed at one end a shoulder or flange 14. This flange is bored at one side to receive a set screw 16 by which the hub is secured to the shaft. A collar 18 is fitted tightly over the hub against the inner face of the flange 14. The collar 18 is also provided with a flange 20. A pair of sheave sections 22, 24 are clamped between the flanged portions of the collar and the hub respectively, these sections being tapered so that when they are brought together they form a groove to receive a belt 26 which may be of either the round or the V type.

The driving connection between the hub and the inner sheave section 22 is effected by slabbing off one side 28 of the flange on the hub so that the perimeter of the flange is non-circular. A recess 30 is cut into the outer side of the inner sheave section 22, this recess being of such shape that the slabbed-off flange of the hub may fit into it, interlocking the two parts. Thus, when the hub 10 is rotated, the inner sheave section 22 will rotate with it. The driving connection to the outer sheave section 24 is effected in a similar manner by forming a flat 32 on one side of the flange 20 so that the outer sheave section 24 and the collar 18 will rotate together. The collar 18 is preferably fitted so tightly over the hub that nothing further than the frictional engagement between these two parts is necessary to form a driving connection, assembling being effected by an arbor press or similar device.

As an additional means for driving the outer sheave section 24, a driving ring 34 may be inserted in recesses 36 provided on the inner faces of the sheave sections, this ring also being slabbed off at one side 38 so that when the pulley is assembled a positive driving connection will be formed between all the parts by the slabbed-off sides of the ring and the flanges on the collar and the hub. It is desired to call attention to the fact that, while the interlocking of various parts has as illustrated been effected by forming a flat on one side of the circular flange or the ring so that they are non-circular, the same purpose may be accomplished by use of any of a number of different forms of interlocking parts, it being necessary only to insure that no relative rotation may occur between the different members.

Fig. 3 illustrates how the effective diameter of the pulley may be varied. In such case, a spacing ring 40 of a suitable width is inserted between the sheave sections so that the parallel portions of their inner faces are not in contact and a slightly longer collar 42 is also provided. The ring may be slabbed off to form a driving connection between the sheave sections, or alternatively, as illustrated in Fig. 4, an ordinary washer 44 may be used which will serve simply to separate the sheave sections and thus decrease the effective diameter of the pulley. In this latter case the inner sheave section 22 will be driven by the hub, the outer sheave section 24 by the collar, and the collar will be driven by the hub, the collar fitting over the hub sufficiently tightly so that the two will rotate together. Other than this, the parts are the same. The point at which the belt engages the tapered portions of the sheave sections may thus be varied at will simply by disassembling the pulley, inserting a spacing ring of suitable thickness, and then reassembling the pulley by means of an arbor press or similar pressure applying device. Variations beyond the limits possible with washers of different thicknesses may be obtained by use of sheave sections of different diameters. Thus, a complete range of sizes of pulley requires only a few sets of sheave sections of graduated sizes and a series of spacing rings and collars of varying widths.

Having thus described the invention, what I claim as new and desire to secure by Letters Patent of the United States is:

1. A pulley structure comprising a hub having an integral flange, a collar fitting over said hub and having a similar integral flange, interchangeable sheave sections clamped between the flanges, and a driving ring between said sheave sections, said driving ring having one side slabbed off to fit into corresponding recesses on the inner faces of said sheave sections and said flanges each being slabbed off at one edge to fit into a corresponding recess on the outside of the adjacent sheave section thereby to form a driving connection between said hub and said sheave sections.

2. A pulley structure comprising a smooth hub having an integral, non-circular flange, a collar having a similar, integral, non-circular flange and having a smooth bore which has a tight frictional fit upon the hub, and sheave sections each having a non-circular recess formed to receive and interlock with one of said flanges, said sheave sections being clamped between said flanges by forcing the collar upon the hub and the elements being held in assembled relation solely by the friction between the hub and the collar.

HARRY E. DOW.